(12) United States Patent
Stultz et al.

(10) Patent No.: US 9,515,448 B2
(45) Date of Patent: Dec. 6, 2016

(54) MICROCHIP LASER WITH SINGLE SOLID ETALON AND INTERFACIAL COATING

(71) Applicant: Raytheon Company, Waltham, MA (US)

(72) Inventors: Robert D. Stultz, Cypress, CA (US); Juan Carlos Sotelo, Hawthorne, CA (US); David M. Filgas, Newbury Park, CA (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 13/627,633

(22) Filed: Sep. 26, 2012

(65) Prior Publication Data

US 2014/0086268 A1 Mar. 27, 2014

(51) Int. Cl.
| | |
|---|---|
| *H01S 3/06* | (2006.01) |
| *H01S 3/08* | (2006.01) |
| *H01S 3/113* | (2006.01) |
| *H01S 3/16* | (2006.01) |
| *H01S 3/0941* | (2006.01) |

(52) U.S. Cl.
CPC ......... *H01S 3/0627* (2013.01); *H01S 3/08036* (2013.01); *H01S 3/113* (2013.01); *H01S 3/0612* (2013.01); *H01S 3/0621* (2013.01); *H01S 3/09415* (2013.01); *H01S 3/1618* (2013.01); *H01S 3/1643* (2013.01)

(58) Field of Classification Search
CPC .. H01S 3/0621; H01S 3/0627; H01S 3/08027; H01S 3/08031; H01S 3/08036; H01S 3/1112; H01S 3/1115; H01S 3/1118; H01S 3/1127; H01S 3/113

USPC ...................................................... 372/11, 19
See application file for complete search history.

(56) References Cited

U.S. PATENT DOCUMENTS

| | | | | |
|---|---|---|---|---|
| 4,797,893 | A | * | 1/1989 | Dixon .............................. 372/66 |
| 5,187,714 | A | | 2/1993 | Okazaki et al. |
| 5,237,578 | A | | 8/1993 | Amano |
| 5,394,413 | A | | 2/1995 | Zayhowski |
| 5,402,437 | A | | 3/1995 | Mooradian |
| 5,497,388 | A | | 3/1996 | Goto et al. |
| 5,691,989 | A | | 11/1997 | Rakuljic et al. |
| 5,754,333 | A | * | 5/1998 | Fulbert et al. ................. 359/330 |
| 5,796,766 | A | | 8/1998 | Hargis et al. |
| 5,825,465 | A | | 10/1998 | Nerin et al. |
| 6,023,479 | A | * | 2/2000 | Thony et al. .................... 372/11 |

(Continued)

FOREIGN PATENT DOCUMENTS

WO    WO 9945612 A1 *  9/1999  ............. H01S 3/082

OTHER PUBLICATIONS

Dong et al., "Sub-nanosecond Passively Q-Switched Yb:YAG/Cr4+:YAG Sandwiched Microchip Laser," 2006, Appl. Phys. B, 85, 513-518.*

(Continued)

*Primary Examiner* — Joshua King

(57) ABSTRACT

A microchip laser includes a microchip laser base comprising a gain region and a passive Q-switch region. The microchip laser also includes a solid etalon coupled to the microchip laser base, and an interfacial coating disposed between the microchip laser base and the solid etalon. In some embodiments, the microchip laser further includes a dichroic coating disposed on a surface of the microchip laser base opposite the interfacial coating.

20 Claims, 7 Drawing Sheets

(56) References Cited

U.S. PATENT DOCUMENTS

| | | | | |
|---|---|---|---|---|
| 6,101,201 | A | * | 8/2000 | Hargis .................. H01S 3/0627 372/107 |
| 6,173,001 | B1 | * | 1/2001 | Zayhowski .................. 372/108 |
| 6,335,942 | B1 | | 1/2002 | Huang et al. |
| 6,931,047 | B2 | | 8/2005 | Kan et al. |
| 7,324,568 | B2 | | 1/2008 | Spariosu et al. |
| 7,649,920 | B2 | | 1/2010 | Welford |
| 2003/0039274 | A1 | | 2/2003 | Neev et al. |
| 2004/0076212 | A1 | | 4/2004 | Nunokawa et al. |
| 2006/0245680 | A1 | | 11/2006 | Rasmussen et al. |
| 2007/0116068 | A1 | * | 5/2007 | Mao ................................ 372/10 |
| 2008/0247425 | A1 | * | 10/2008 | Welford .......................... 372/10 |
| 2009/0016385 | A1 | | 1/2009 | Sakai et al. |
| 2009/0122816 | A1 | * | 5/2009 | Wagner et al. ................. 372/20 |
| 2010/0215069 | A1 | | 8/2010 | Otsuka |
| 2012/0140782 | A1 | * | 6/2012 | Sotelo et al. ................... 372/10 |
| 2013/0114627 | A1 | * | 5/2013 | Filgas et al. ..................... 372/11 |

OTHER PUBLICATIONS

Dong et al., "Switchable Pulses Generation in Passively Q-Switched Multilongitudinal-Mode Microchip Laser," 2007, Laser Phys. Lett. 4, No. 2, 109-116.*
Schmitt et al., "Design and Performance of a High-Repetition-Rate Single-Frequency Yb:YAG Microlaser," 2008, Proc. of SPIE, vol. 6871, 687105, 1-10.*
Svelto, "Principles of Lasers," 1998, Plenum Press, 4th edition, 285-287 and 344.*
International Search Report dated Jan. 7, 2014 in connection with International Patent Application No. PCT/US2013/52234, 3 pages.
Written Opinion of International Searching Authority dated Jan. 7, 2014 in connection with International Patent Application No. PCT/US2013/52234, 5 pages.
Y. Wang, et al., "Stable polarization short pulse passively Q-switched monolithic microchip laser with [110] cut Cr4+:YAG", Laser Phys. Lett. 6, No. 11, 2009, p. 788-790.
G.J. Spuhler, et al., "Experimentally confirmed design guidelines for passively Q-switched microchip lasers using semiconductor saturable absorbers", J. Opt. Soc. Am. B/vol. 16, No. 3, Mar. 1999, p. 376-388.
Adelbert Owyoung, et al., "Stress-induced tuning of a diode-laser-excited monolithic Nd:YAG laser", Optics Letters, vol. 12, No. 12, Dec. 1987, p. 999-1001.
J.J. Zayhowski, et al., "Miniature Solid-State Lasers" Aug. 25, 2006, 143 pages.
J.J. Zayhowski, "Microchip Lasers", The Lincoln Laboratory Journal, vol. 3, No. 3, 1990, p. 427-446.
J.J. Zayhowski, et al., "Diode-pumped passively Q-switched picosecond microchip lasers", Optics Letters, vol. 19, No. 18, Sep. 15, 1994, p. 1427-1429.
J.J. Zayhowski, et al., "Single-frequency microchip Nd lasers", Optics Letters, vol. 14, No. 1, Jan. 1, 1989, p. 24-26.
J.J. Zayhowski, et al., "Frequency-modulated Nd:YAG microchip lasers", Optics Letters, vol. 14, No. 12, Jun. 15, 1989, p. 618-620.
U.S. Patent Application titled "Low Timing Jitter, Single Frequency, Polarized Laser" U.S. Appl. No. 12/962,214, filed Dec. 7, 2010; 21 pages.
U.S. Patent Application titled "Laser System and Method for Producing a Linearly Polarized Single Frequency Output Using Polarized and Non-Polarized Pump Diodes" U.S. Appl. No. 13/290,853, filed Nov. 7, 2011; 23 pages.
Partial European Search Report dated Dec. 20, 2012 in connection with European Patent Application No. EP 12 18 3188, 8 pages.
H. Sakai, et al., "Polarization stabilizing for diode-pumped passively Q-switched Nd: YAG microchip lasers", Jan. 29, 2006, 3 pages.

N. MacKinnon, et al., "A laser diode array pumped, Nd: YVO4/KTP, composite material microchip laser", Optics Communications, vol. 105, No. 3-4, Feb. 1, 1994, p. 183-187.
Kangin Lee, et al., "Pump laser effect on temporal jittering of pulses from passively Q-Switched Nd: YVO4 laser", Feb. 11, 2010, 8 pages.
European Search Report dated Apr. 15, 2013 in connection with European Patent Application No. EP 12 18 3188, 9 pages.
U.S. Office Action dated Apr. 15, 2014 in connection with U.S. Appl. No. 12/962,214; 13 pages.
U.S. Office Action dated Jul. 31, 2012 in connection with U.S. Appl. No. 12/962,214; 11 pages.
U.S. Office Action dated Dec. 20, 2011 in connection with U.S. Appl. No. 12/962,214; 9 pages.
U.S. Office Action dated May 7, 2014 in connection with U.S. Appl. No. 13/290,853; 16 pages.
U.S. Office Action dated Mar. 22, 2013 in connection with U.S. Appl. No. 13/290,853; 16 pages.
U.S. Office Action dated Oct. 12, 2012 in connection with U.S. Appl. No. 13/290,853; 14 pages.
European Application Serial No. 11183955.1, Examination Notification Art. 94(3) mailed Sep. 25, 2013; 3 pages.
European Application Serial No. 11183955.1, Office Action mailed Jan. 21, 2013; 2 pages.
European Application Serial No. 11183955.1 Response filed Nov. 15, 2013 to Examination Notification Art. 94(3) mailed Sep. 25, 2013; 11 pages.
European Application Serial No. 11183955.1, Response filed Jun. 28, 2013 to Extended European Search Report mailed Dec. 17, 2012; 12 pages.
European Application Serial No. 11183955.1, Extended European Search Report mailed Dec. 17, 2012; 6 pages.
Cole, B. "Reduction in timing jitter for a Cr:YAG Q-switched Nd:YAG laser"; SPIE vol. 7578—Solid State Lasers XIX: Technology and Devices;2010; 7 pages.
Cole, B. "Reduction of timing jitter in a Q-Switched Nd:YAG laser by direct bleaching of a Cr4+:YAG saturable absorber"; Optics Express, vol. 17 No. 3; Feb. 2, 2009; pp. 1766-1771.
Huang, S.L. et al.; "Timing Jitter Reduction of a Passively Q-Switched Laser"; Japanese Journal of Applied Physics, vol. 38; Part 2, No. 3A; Mar. 1, 1999; L239-L241.
Khurgin, J.B. et al.; "Timing jitter reduction in diode pumped passively Q-switched laser with composite pumping pulses"; Technical Digest, Summaries of papers presented at the Conference on Lasers and Electro-Optics CLEO '01; May 11, 2001; pp. 532-533.
Tidemand-Lichtenberg, P. et al.; "Synchronization of 1064 and 1342 nm pulses using passive saturable absorbers", Optics Communications, 241(4-6) 2004; pp. 487-492.
John J. Zahyowski et al.; "Pump-Induced Bleaching of the Saturable Absorber in Short-Pulse Nd:YAG/CR4+:YAG Passively Q-Switched Microchip Lasers"; IEEE Journal of Quantum Electronics, 39(12); Dec. 2003; pp. 1588-1593.
Yin, X. "Actively-Controllable Passively Q-Switched Laser"; SPIE 5627—High-Power Lasers and Applications III, 2005; pp. 199-208.
Israeli Application Serial No. 215534; Amendment filed Apr. 16, 2012; 3 pages.
Cole, et al.; "Optical triggering of a Q-switched Nd:YAG laser via transverse bleching of a Cr:YAG saturable absorber"; Applied Optics; vol. 48, No. 31; Nov. 2009; 7 pages.
Vorobiev, et al.; "Single-frequency-mode Q-switched Nd:YAG and Er:glass lasers controlled by volumn Bragg gratings"; Optics Express 9199; vol. 16. No. 12; Jun. 9, 2008; 6 pages.
Jun Dong, et al., "Composite Yb:YAG/Cr4+:YAG ceramics picosecond microchip lasers", Optics Express, vol. 15, No. 22, Oct. 29, 2007, p. 14516-14523.
Supplementary European Search Report dated Nov. 2, 2015 in connection with European Patent Application No. EP 13 84 2722.

* cited by examiner

MICROCHIP LASER WITH SINGLE SOLID ETALON AND INTERFACIAL COATING

TECHNICAL FIELD

This disclosure is generally directed to laser systems. More specifically, this disclosure is directed to a microchip laser with a single solid etalon and interfacial coating.

BACKGROUND

Laser devices generate narrow beams of light using optical amplification. Emission from lasers can be characterized as either single-longitudinal-mode or multi-longitudinal-mode emission. A key component of a laser is an optical cavity, which constrains a significant portion of the laser light to make multiple passes through a gain (amplifying) component. Laser cavities have resonant frequency modes separated by $c/2L$, where c is the speed of light in vacuum and L is the optical path length of the laser cavity. These frequency modes are also referred to as longitudinal modes of the laser cavity. Single-longitudinal-mode emission generally refers to light generated by a laser when only one of these frequency modes is present. In contrast, multimode emission generally refers to light generated by a laser when more than one frequency mode is present at the same time. Single-mode emission is often preferred over multi-mode emission for many reasons. One important reason is that multi-mode emission creates high intensity modulation spikes (mode-beating) which can be as much as N times higher than the peak intensity of single-longitudinal-mode emission, where N is the number of longitudinal modes simultaneously present. In the case of Q-switched or short-pulse lasers, the higher peak intensity associated with mode-beating can enhance parasitic nonlinear effects such as self-focusing or stimulated Raman scattering, as the laser light is transmitted through otherwise transparent optical media. In this case, it may be acceptable that the pulses consist of different longitudinal modes, so long as only one of these longitudinal modes is present within each pulse. In some remote sensing applications, single-longitudinal-mode emission is desired to efficiently couple into a narrow absorption line or transmit through a narrow optical bandpass filter. Also, mode beating is a source of noise. An etalon, or Fabry-Perot etalon, is a device often used in laser design as a wavelength or frequency mode selecting component. An etalon typically includes two flat, parallel optical surfaces that are separated by a gap. The gap can be filled with air (as in an "air-gap etalon") or include a solid material (as in a "solid etalon").

SUMMARY

This disclosure provides a microchip laser with a single solid etalon and interfacial coating.

In a first embodiment, a microchip laser includes a microchip laser base comprising a gain region and a passive Q-switch region. The microchip laser also includes a solid etalon coupled to the microchip laser base, and an interfacial coating disposed between the microchip laser base and the solid etalon.

In a second embodiment, a laser system includes a pump diode, relay optics, and a microchip laser. The pump diode is configured to produce light at a first wavelength. The relay optics is configured to receive the light from the pump diode. The microchip laser is configured to receive the light from the relay optics. The microchip laser includes a microchip laser base comprising a gain region and a passive Q-switch region. The microchip laser also includes a solid etalon coupled to the microchip laser base, and an interfacial coating disposed between the microchip laser base and the solid etalon.

In a third embodiment, a method of producing a laser output includes producing a light at a first wavelength and receiving, at a microchip laser, the light at the first wavelength. The method also includes generating, at the microchip laser, the laser output. The microchip laser includes a microchip laser base comprising a gain region and a passive Q-switch region. The microchip laser also includes a solid etalon coupled to the microchip laser base, and an interfacial coating disposed between the microchip laser base and the solid etalon.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
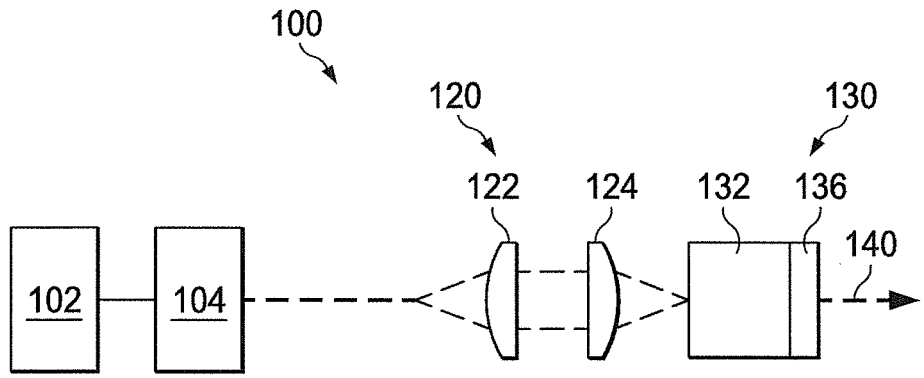
FIG. 1 illustrates a laser system, according to an embodiment of the disclosure.

FIGS. 1 through 6B, described below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

This disclosure provides a novel, robust means for obtaining a single frequency output with a microchip laser. The new laser device is not sensitive to adverse environmental conditions such as temperature changes and mechanical vibration and shock. It is also, by its nature, relatively insensitive to changes in diode pump power. The monolithic nature of its architecture allows for significantly less complex mounting hardware. This device is ideally suited for space and airborne active sensor applications.

Microchip lasers are well known in the art. In one example, a monolithic microchip laser includes an air-gap etalon attached to the body of the microchip. In most cases, however, the coefficient of thermal expansion (CTE) and temperature coefficient of refractive index (dn/dT) of the air-gap etalon are not matched to the body of the microchip.

Thus, the etalon and microchip body become detuned with respect to each other as the result of temperature and pump diode current changes.

In another example, a microchip laser includes a volume Bragg grating (VBG). Typically, however, such a laser requires a two-piece or multi-piece (not monolithic) design where the components must be kept rigidly in alignment with one another. The multi-piece design is inherently more complicated than a monolithic design. Furthermore, the VBG mirrors are composed of materials that are dissimilar to that of the remainder of the microchip. Thus, the CTE and dn/dT values of the VBG are not matched to the body material of the microchip. Thus, a microchip laser with VBG may also be sensitive to changes in ambient temperature and pump diode current.

In a third example, ultra-thin microchip lasers featuring a monolithic design are known. However, to function as a single-frequency laser, the microchip laser must be thin so the longitudinal mode separation (c/2 L) is large enough that only one mode lies within the emission line width of the gain material. For example, in the case of Ytterbium-doped YAG (yttrium aluminum garnet) (Yb:YAG), the microchip laser should not be thicker than approximately 220 microns. A thin microchip will have a correspondingly small transverse mode volume, and therefore the pulse energy will be significantly lower than some laser applications require.

To address these deficiencies in the art, embodiments of this disclosure provide a monolithic microchip laser with an attached solid etalon that acts to limit the number of longitudinal (frequency) modes. The monolithic microchip structure and attached solid etalon are constructed using the same host material and without the use of adhesives. An imbedded (interfacial) coating is used in conjunction with an outer surface of the etalon to form the solid etalon. In accordance with certain embodiments, the outer etalon surface is uncoated. The outer etalon surface and the imbedded coating form a resonant-reflector outcoupler of the microchip. The attached solid etalon provides additional longitudinal mode discrimination and enables single-longitudinal-mode operation with a microchip thickness greater than that allowed for a monolithic microchip without an etalon.

FIG. 1 illustrates a laser system 100, according to an embodiment of this disclosure. Although certain details will be provided with reference to the components of the laser system 100 of FIG. 1, it should be understood that other embodiments may include more, fewer, or different components. The laser system 100 of FIG. 1 includes a driver 102, a pump diode 104, relay optics 120, and a microchip laser crystal 130. As described in more detail below, the laser system 100 in this embodiment is configured to generate a laser output 140, such as a single-longitudinal-mode output.

The driver 102 in the embodiment of FIG. 1 is configured to drive the pump diode 104, which in this embodiment produces energy, light, or electromagnetic radiation ("energy, light, or electromagnetic radiation" hereinafter referred to as "light"). In particular configurations, the driver 102 may produce either a continuous light wave or a pulsed light wave from the pump diode 104. Additionally, in particular configurations, the driver 102 may modulate the pump diode 104, for example, in producing the pulsed light wave.

The pump diode 104 is shown coupled via fiber to the relay optics 120. The relay optics 120 in particular configurations may transfer the light from the pump diode to the microchip laser crystal 130. One of ordinary skill in the art will recognize the details of the relay optics 120; accordingly, the details will not be explained. As recognized by one of ordinary skill in the art, relay optics 120 may include, among other components, lenses 122 and 124 to focus the light being transmitted therethrough.

The microchip laser crystal 130 in this embodiment includes a microchip laser base 132 and a solid etalon 136. The microchip laser base 132 absorbs the pump light and emits light at the laser system's output wavelength, as will be recognized by one of ordinary skill in the art. For example, the microchip laser base 132 may emit light at a wavelength of 1030 nm. The solid etalon 136 is attached to the microchip laser base 132 and is comprised of the same host material as the microchip laser base 132. Embodiments of the microchip laser crystal 130 in accordance with this disclosure will be described in greater detail below.

Figure 2:
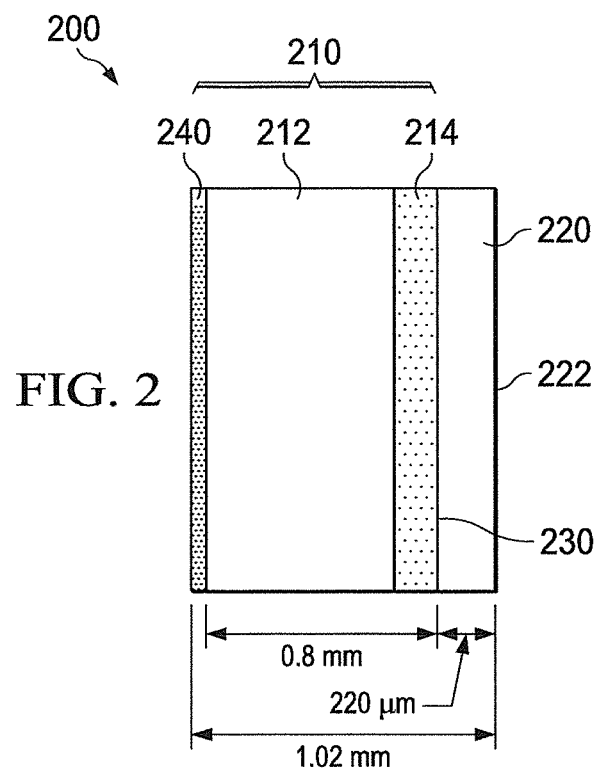
FIG. 2 illustrates a single-longitudinal-mode microchip laser, according to an embodiment of this disclosure.

FIG. 2 illustrates a single-longitudinal-mode microchip laser, according to an embodiment of this disclosure. Although certain details will be provided with reference to the components of the microchip laser 200 of FIG. 2, it should be understood that other embodiments may include more, fewer, or different components. The microchip laser 200 could be used as the microchip laser crystal 130 in the laser system 100 of FIG. 1. However, the microchip laser 200 could also be used in any other suitable device or system.

The microchip laser 200 includes a microchip laser base 210, a solid etalon 220, a reflective interfacial optical coating 230 and a dichroic coating 240. The microchip laser base 210 includes a gain region 212 and a passive Q-switch region 214 that are diffusion-bonded to each other. In an embodiment, each base region 212, 214 is formed of a crystalline YAG host. However, it will be understood that other materials, such as phosphate glass, may be used in the base regions 212, 214. In an embodiment, the base regions 212, 214 are lightly doped with laser-active ions (e.g. Er3+, Yb3+, or Nd3+) or saturable-absorber ions (e.g. Cr4+). For example, the gain region 212 may be doped with ytterbium (Yb) and the passive Q-switch region 214 may be doped with chromium (Cr). Also, the gain region 212 may be co-doped with both a laser-active ion and a sensitizer ion, e.g., Er and Yb. In such an embodiment, the sensitizer ion absorbs the pump light and transfers its energy to the laser-active ion. In another embodiment, the base 210 may be composed of a single region that is co-doped with both a laser-active ion and a saturable-absorber ion, e.g., Yb and Cr. In one embodiment, the microchip laser base 210 is approximately 0.8 mm thick, although other thicknesses are possible, depending on the desired wavelength, pulse energy, and other properties.

The solid etalon 220 is composed of the same host material (e.g., crystalline YAG or glass) as the microchip laser base regions 212, 214. However, in an embodiment, the solid etalon 220 is not doped with laser-active or saturable-absorber ions. Because the doping concentrations of the base regions 212, 214 are relatively low, the thermal properties (e.g., CTE and dn/dT) of the etalon 220 and the base regions 212, 214 are closely matched. This characteristic helps to ensure that the microchip laser 200 is very insensitive to ambient temperature changes. The solid etalon 220 includes an uncoated outer surface 222. However, in some embodiments, it is possible to coat the outer surface 222. In one embodiment, the solid etalon 220 is approximately 220 μm thick, although other thicknesses are possible, depending on desired wavelength, pulse energy, and other properties.

The interfacial coating 230 is applied at the interface between the solid etalon 220 and the microchip laser base 210. The reflectance of the interfacial coating 230 at the laser wavelength is selected to match the Fresnel reflectance of the uncoated outer etalon surface 222. In an embodiment, the reflectance of the interfacial coating 230 is approximately 8.5%. In embodiments where the outer surface 222 is coated, the reflectance of the outer surface 222 may be substantially matched to that of the interfacial coating 230. Together, the outer surface 222 and the interfacial coating 230 form a resonant-reflector outcoupler of the microchip laser 200.

The dichroic coating 240 is formed on a surface of the microchip laser base 210 opposite from the interfacial coating 230. The dichroic coating 240 functions as an interference filter or color filter that selectively passes light in a small range of wavelengths while reflecting other wavelengths, as known in the art. In an embodiment, the dichroic coating 240 exhibits approximately 100% transmittance of light at a wavelength of 940 nm, and approximately 100% reflectance of light at a wavelength of 1030 nm.

The thicknesses of the solid etalon 220 and the microchip laser base 210 are selected so that a longitudinal mode of the net microchip laser cavity (formed by the base 210 and etalon 220) is at or near the peak reflectance of the etalon (resonant reflector). In an embodiment, the overall thickness of the microchip laser 200 is approximately 1.02 mm. Thus, in operation, the spectrum of the etalon 220 does not go out of alignment with the cavity mode spectrum, as described in greater detail below. This is a novel approach to making a single-frequency microchip oscillator that reproduces the laser frequency on a pulse-to-pulse basis and allows broad temperature tolerance. The layers of the microchip laser 200 (the microchip laser base 210, solid etalon 220, reflective interfacial optical coating 230, and dichroic coating 240) are bonded together without adhesives. The monolithic nature of the microchip laser 200 allows for significantly less complex mounting hardware and makes the microchip laser much less sensitive to mechanical vibration and shock.

Although FIG. 2 illustrates one example of the microchip laser 200, various changes may be made to FIG. 2. For example, as shown in FIG. 2, the solid etalon 220 is undoped. However, it is possible to dope the solid etalon 220 with an inert ion. In addition, although the base regions 212, 214 are doped with Yb and Cr respectively, the base regions may be doped with other ions or be formed of other materials.

Figure 3A:
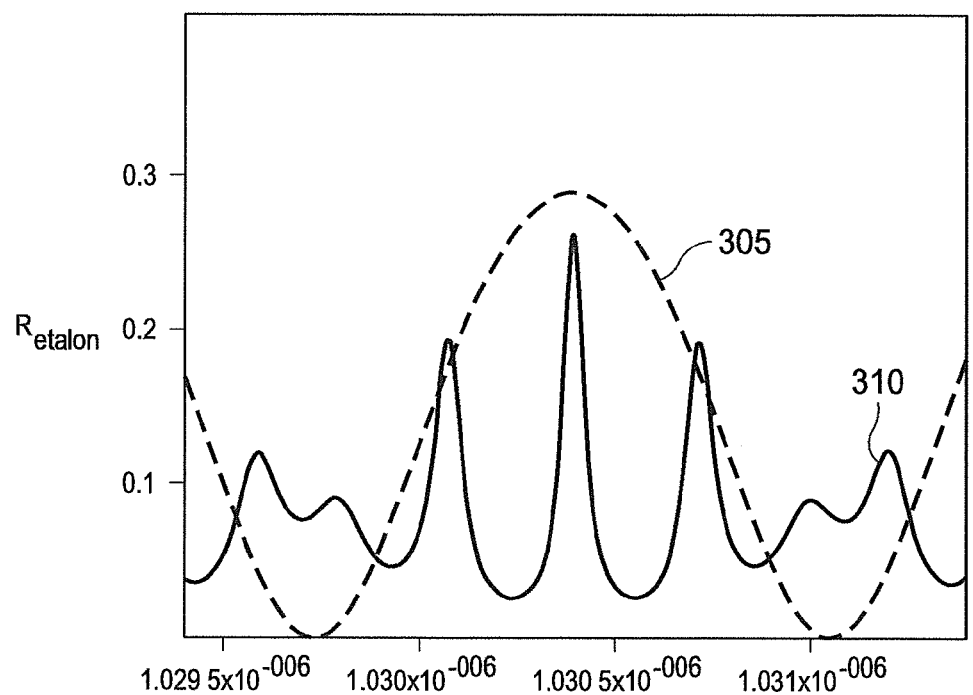
FIGS. 3A and 3B depict etalon and cavity mode graphs of the microchip laser of FIG. 2, according to an embodiment of this disclosure.
Figure 3B:
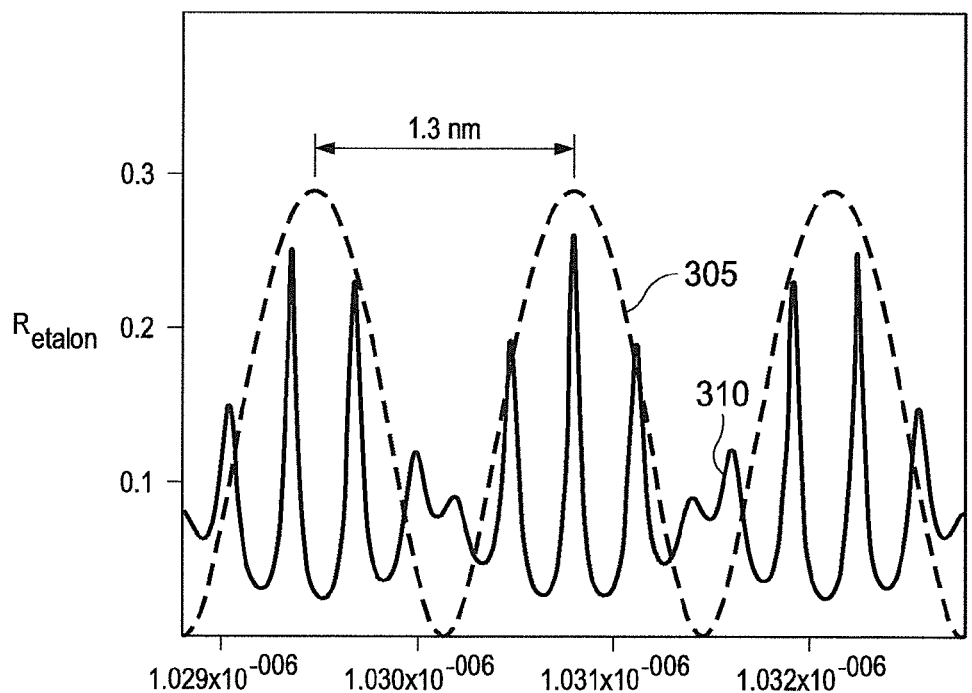
Figure 4A:
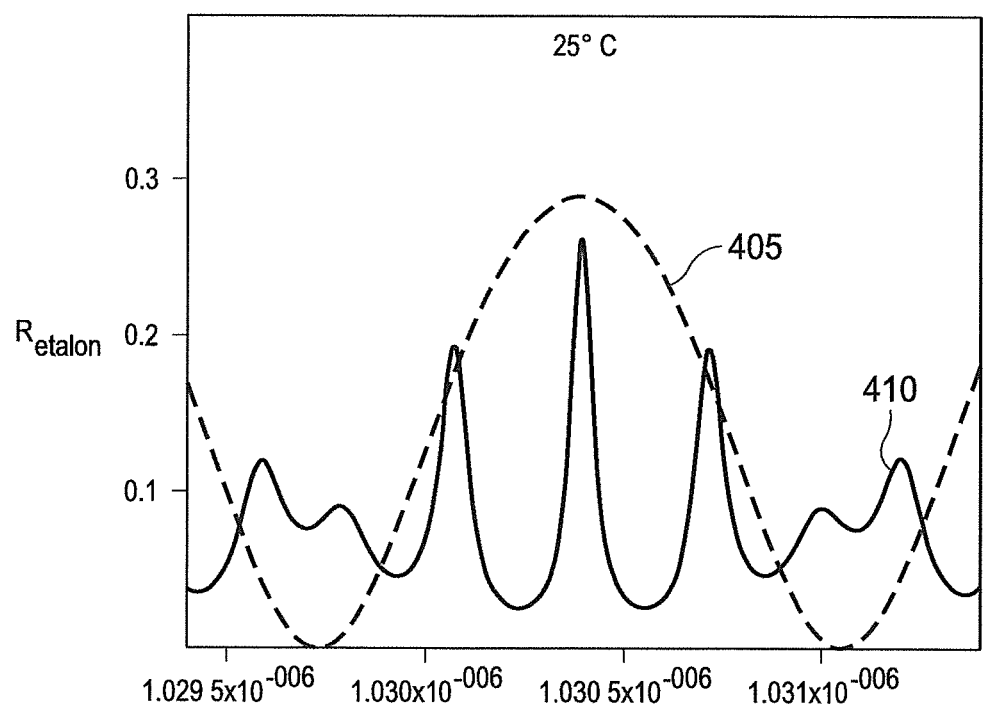
FIGS. 4A through 4F depict graphs illustrating temperature sensitivity of the microchip laser of FIG. 2, according to an embodiment of this disclosure.
Figure 4B:
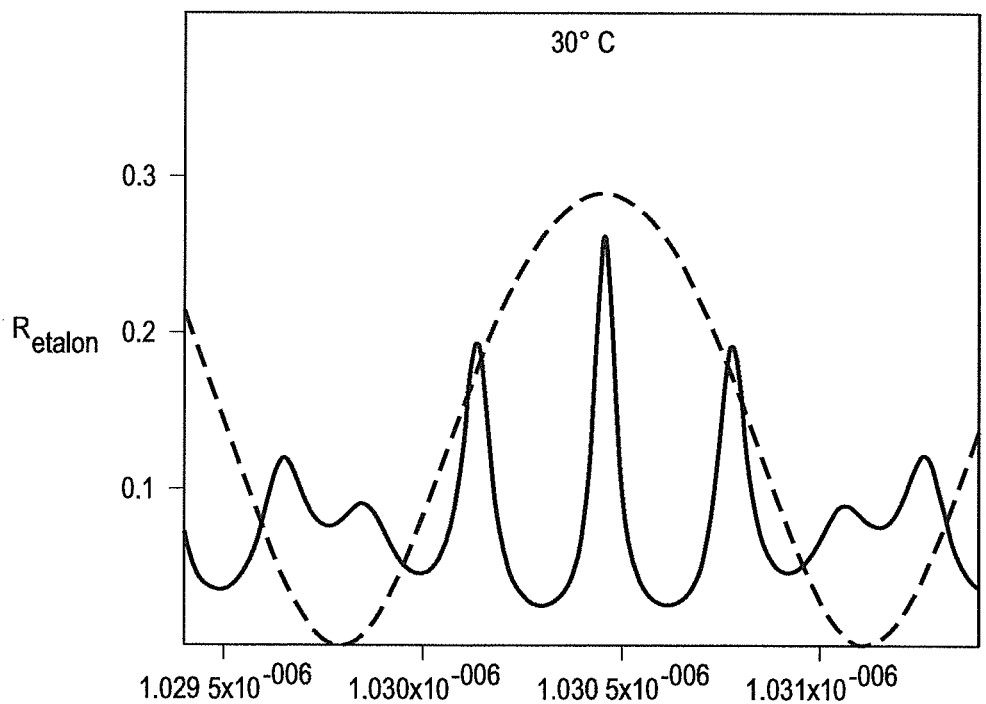
Figure 4C:
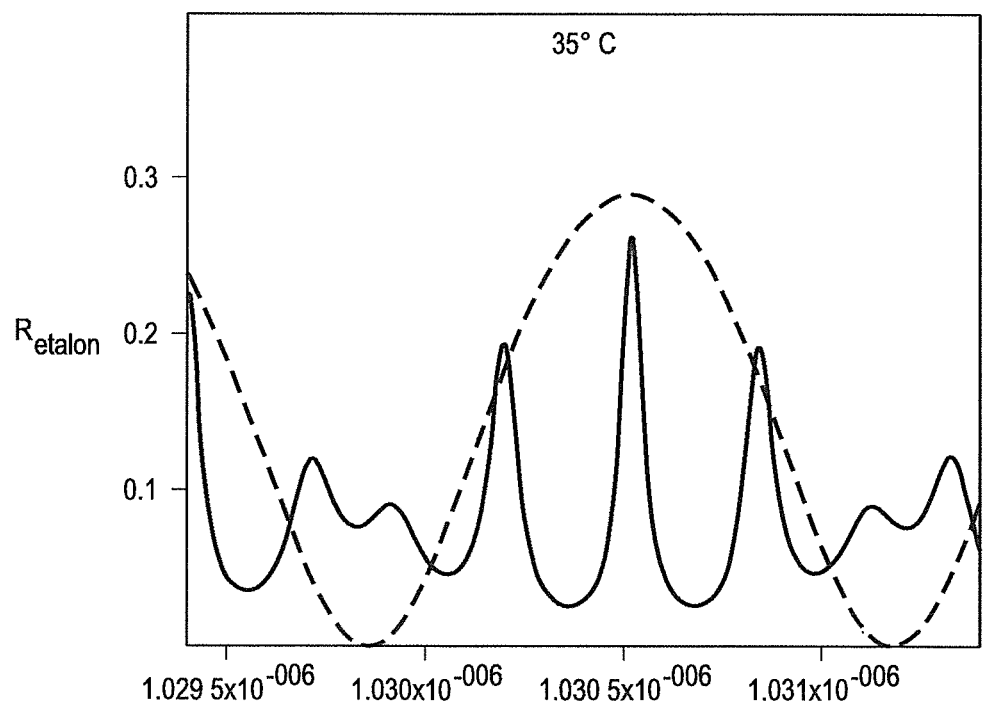
Figure 4D:
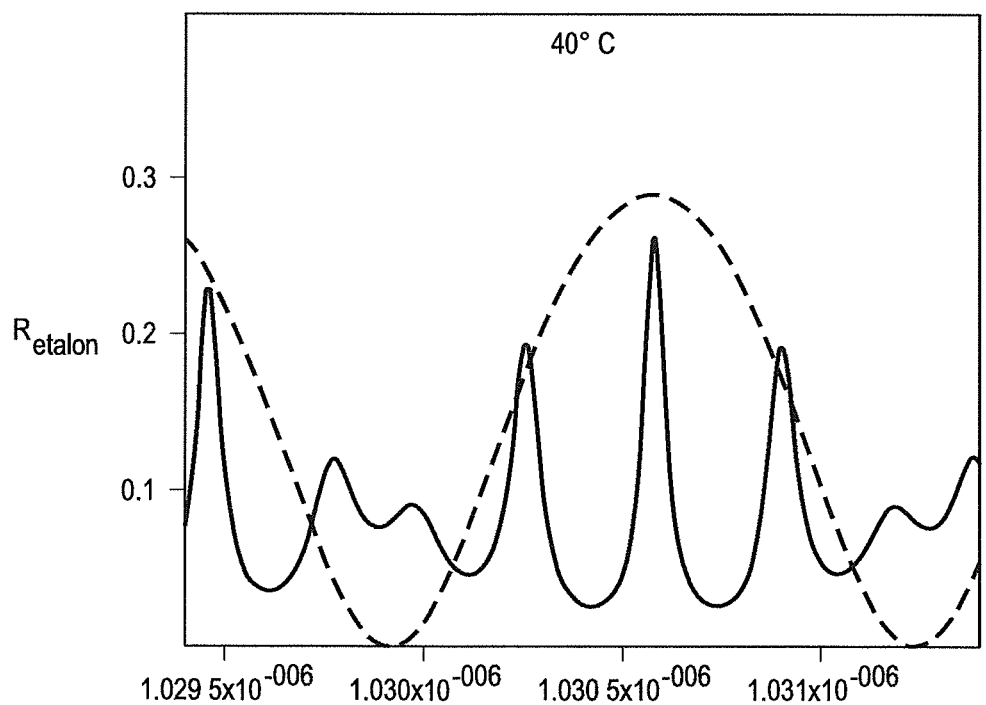
Figure 4E:
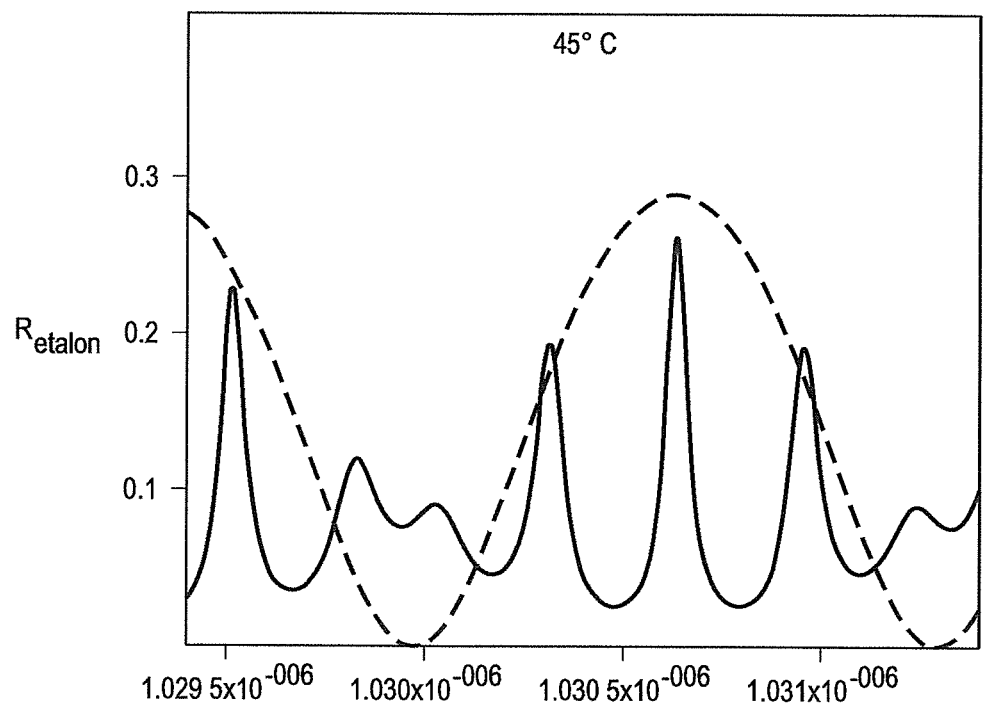
Figure 4F:
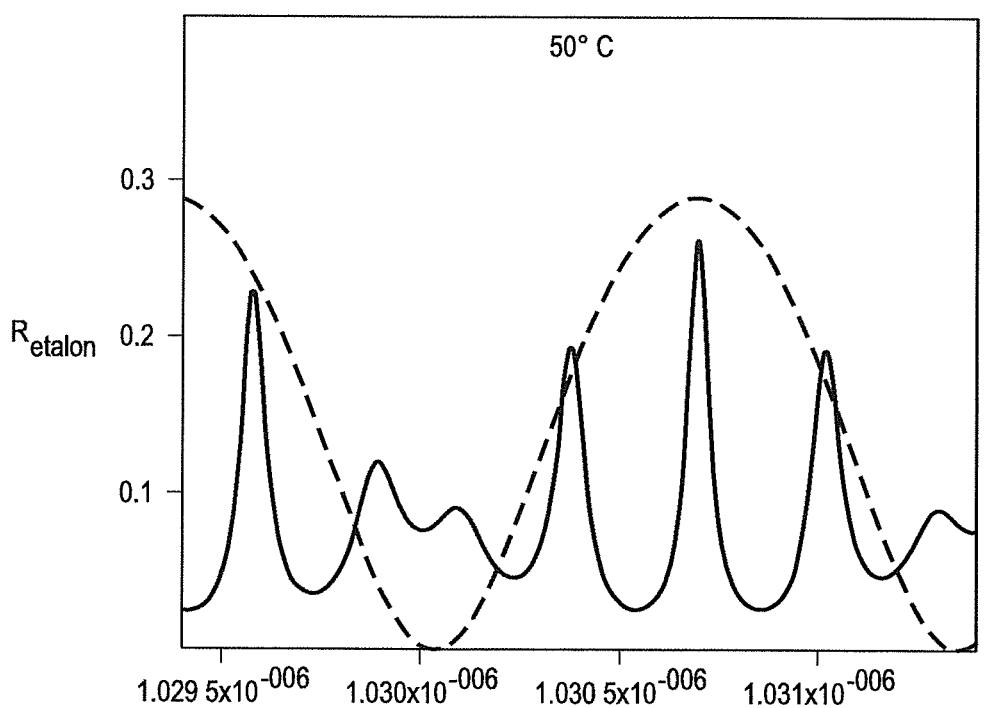

FIGS. 3A and 3B depict etalon and cavity mode graphs of the microchip laser 200, according to an embodiment of this disclosure. Each of the graphs in FIGS. 3A and 3B includes an etalon plot line 305 and a cavity mode plot line 310. The etalon plot line 305 shows the change in the reflectivity of the etalon over different wavelengths. Similarly, the cavity mode plot line 310 depicts the cavity modes of the overall microchip cavity over different wavelengths. The plot lines in FIG. 3B represent the same information as the plot lines in FIG. 3A, however the scale of the X-axis in FIG. 3B is compressed and more than one cycle of each curve is shown. As shown in FIG. 3B, the period, or free-spectral-range, of the etalon plot line 305 is approximately 1.3 nm. The free-spectral-range (FSR) is given by $\lambda^2/(2 nL)$, where $\lambda$ is the wavelength (in vacuum), n is the refractive index of the etalon, and L is the thickness of the etalon. In an embodiment, a FSR of 1.3 nm is sufficient to prevent lasing in the adjacent etalon orders for a microchip with Ytterbium-doped YAG as the gain medium. For microchip designs using other gain materials, the etalon thickness may be adjusted so that the adjacent spectral peaks of the etalon reflectance are far enough away from the emission line peak to prevent lasing there.

FIGS. 4A through 4F depict graphs illustrating temperature sensitivity of the microchip laser 200, according to an embodiment of this disclosure. Like the graphs in FIGS. 3A and 3B, each of the graphs in FIGS. 4A through 4F includes an etalon plot line 405 and a cavity mode plot line 410. The graphs in FIGS. 4A through 4F depict the microchip laser 200 operating at 25° C., 30° C., 35° C., 40° C., 45° C., and 50° C., respectively. Because the solid etalon 220 and the microchip laser base 210 are composed of the same material, the cavity modes and etalon spectral peak track each other over different temperatures. The temperature range is limited only by the gain line width of the laser active section.

Figure 5:
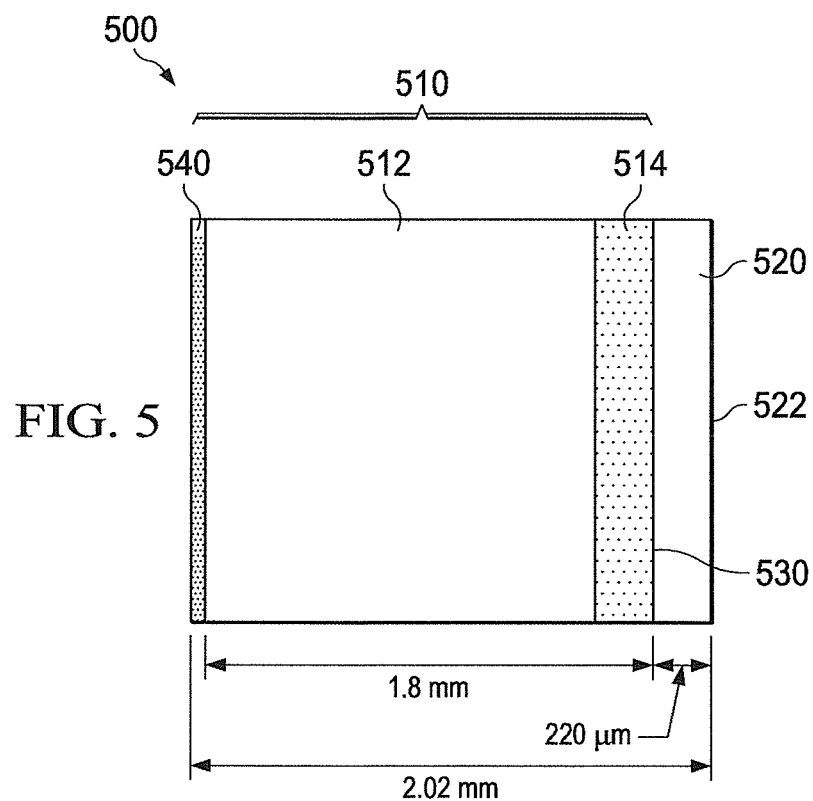
FIG. 5 illustrates a three-mode solid-etalon microchip laser, according to an embodiment of this disclosure.

FIG. 5 illustrates a three-mode solid-etalon microchip laser, according to an embodiment of this disclosure. Although certain details will be provided with reference to the components of the microchip laser 500 of FIG. 5, it should be understood that other embodiments may include more, fewer, or different components. The microchip laser 500 could be used as the microchip laser crystal 130 in the laser system 100 of FIG. 1. However, the microchip laser 500 could also be used in any other suitable device or system.

The microchip laser 500 is, in many respects, the same as or similar to the microchip laser 200 depicted in FIG. 2. However, the thickness of the microchip laser 500 is greater than that of the microchip laser 200 in order to provide for higher pulse energy. In addition, the microchip laser 500 lases on one longitudinal mode per pulse, but does not lase on the same mode in every pulse.

Similar to the microchip laser 200, the microchip laser 500 includes a microchip laser base 510, a solid etalon 520, a reflective interfacial optical coating 530 and a dichroic coating 540. The microchip laser base 510 includes a gain region 512 and a passive Q-switch region 514 that are formed of crystalline YAG or another suitable material. In an embodiment, the gain region 512 is YAG doped with Yb3+ at a concentration of approximately 15%. The passive Q-switch region 514 is YAG doped with chromium Cr4+. The unbleached transmittance of the passive Q-switch region 514 at a wavelength of 1030 nm is approximately 90%.

The solid etalon 520 is composed of the same host material as the microchip laser base regions 512, 514, but is not doped with laser-active or saturable-absorber ions. The thermal properties (e.g., CTE and dn/dT) of the etalon 520 and the base regions 512, 514 are closely matched, which helps to ensure that the microchip laser 500 is very insensitive to ambient temperature changes. The solid etalon 520 typically includes an outer surface 522 that is typically uncoated, but may be coated in some embodiments. In one embodiment, the solid etalon 520 is approximately 220 µm thick, although other thicknesses are possible, depending on desired wavelength, pulse energy, and other properties.

The interfacial coating 530 is applied at the interface between the solid etalon 520 and the microchip laser base 510. The reflectance of the interfacial coating 530 at the laser wavelength is selected to match the Fresnel reflectance of the uncoated outer etalon surface 522. In an embodiment, the reflectance of the interfacial coating 530 is approximately 8.5%. In embodiments where the outer surface 522 is coated, the reflectance of the outer surface 522 may be substantially matched to that of the interfacial coating 530. Together, the outer surface 522 and the interfacial coating 530 form a resonant-reflector outcoupler of the microchip laser 500.

The dichroic coating 540 is formed on a surface of the microchip laser base 510 opposite from the interfacial coating 530. In an embodiment, the dichroic coating 540 exhibits approximately 100% transmittance of light at a wavelength of 940 nm, and approximately 100% reflectance of light at a wavelength of 1030 nm.

The thickness of the microchip laser 500 is selected such that the microchip laser 500 limits the total spectral output to three longitudinal modes. In an embodiment, the overall thickness of the microchip laser 500 is approximately 2.02 mm. The microchip laser 500 emits only one longitudinal mode per pulse over a relatively large range of temperature and pump diode currents.

Although FIG. 5 illustrates one example of the microchip laser 500, various changes may be made to FIG. 5. For example, it is possible to dope the solid etalon 520 with an inert ion. In addition, although the base regions 512, 514 are doped with Yb and Cr respectively, the base regions may be doped with other ions or be formed of other materials.

Figure 6A:
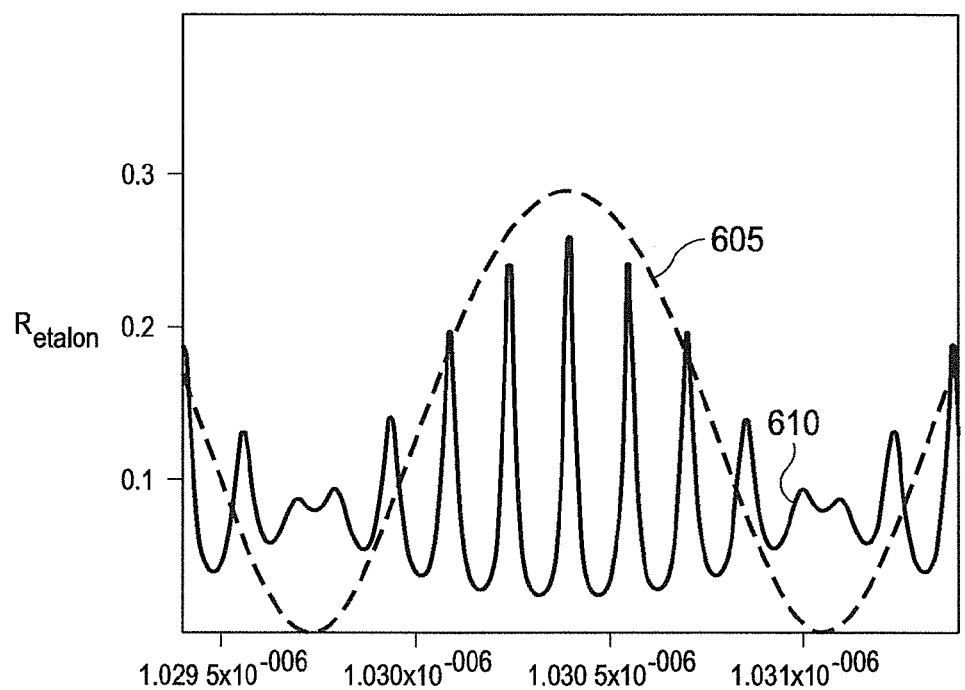
FIGS. 6A and 6B illustrate etalon and cavity mode graphs of the microchip laser of FIG. 5, according to an embodiment of this disclosure.
Figure 6B:
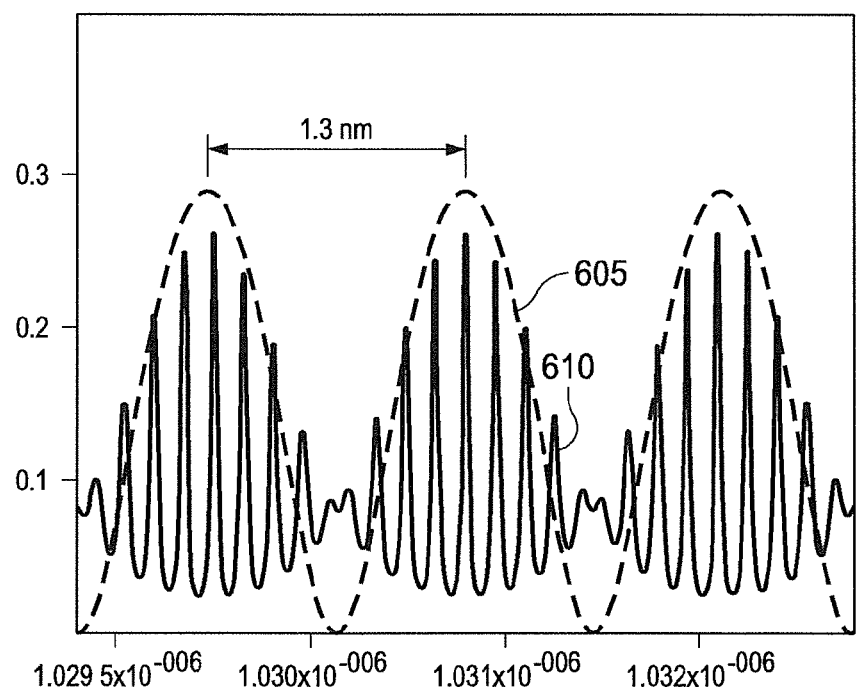

FIGS. 6A and 6B illustrate etalon and cavity mode graphs of the microchip laser 500, according to an embodiment of this disclosure. Similar to the graphs shown in FIGS. 3A and 3B, each of the graphs in FIGS. 6A and 6B includes an etalon plot line 605 and a cavity mode plot line 610. The etalon plot line 605 shows the change in the reflectivity of the etalon over different wavelengths. The cavity mode plot line 610 depicts the cavity modes of the overall microchip cavity over different wavelengths. The plot lines in FIG. 6B represent the same information as the plot lines in FIG. 6A, however the scale of the X-axis in FIG. 6B is compressed and more than one cycle of each curve is shown. As shown in FIG. 6B, the period of the etalon plot line 605 is approximately 1.3 nm. It is can be seen that the etalon plot line 605 and the cavity mode plot line 610 track each other over a number of periods.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A microchip laser, comprising:
a microchip laser base comprising a gain region coupled directly to a passive Q-switch region such that an emitting surface of the gain region is in direct contact with a receiving surface of the passive Q-switch region;
a solid etalon coupled to the microchip laser base; and
an interfacial coating disposed between the microchip laser base and the solid etalon such that a first surface of the interfacial coating is in direct contact with an emitting surface of the passive Q-switch region and a second surface of the interfacial coating is in direct contact with a receiving surface of the solid etalon, the interfacial coating having a reflectance that substantially matches a Fresnel reflectance of an emitting outer surface of the solid etalon;
wherein:
the microchip laser base and the solid etalon are comprised of a same host material;
the microchip laser base, the solid etalon, and the interfacial coating are bonded together without an adhesive;
an overall thickness of the microchip laser is selected such that the microchip laser is configured to lase on different longitudinal modes in different pulses; and
the microchip laser base and the solid etalon form a laser cavity, thicknesses of the microchip laser base and the solid etalon selected such that at least one of the different longitudinal modes is at or near a peak reflectance of the solid etalon.

2. The microchip laser of claim 1, further comprising a dichroic coating disposed on a surface of the microchip laser base opposite the interfacial coating.

3. The microchip laser of claim 1, wherein:
a thickness of the solid etalon is approximately 220 μm; and
a thickness of the microchip laser base is approximately 0.8 mm or approximately 1.8 mm.

4. The microchip laser of claim 1, wherein the outer surface of the solid etalon has a surface coating and a reflectance of the surface coating substantially matches the reflectance of the interfacial coating.

5. The microchip laser of claim 1, wherein the microchip laser is configured to lase on only one longitudinal mode per pulse.

6. The microchip laser of claim 1, wherein:
the host material comprising the microchip laser base is doped with one or more laser-active or saturable-absorber ions; and
the host material comprising the solid etalon is not doped with any laser-active or saturable-absorber ions.

7. The microchip laser of claim 1, wherein the microchip laser base comprises phosphate glass co-doped with a laser-active ion and a sensitizer ion.

8. A laser system, comprising:
a pump diode configured to produce light;
relay optics configured to receive the light from the pump diode; and
a microchip laser configured to receive the light from the relay optics, the microchip laser comprising:
a microchip laser base comprising a gain region coupled directly to a passive Q-switch region such that an emitting surface of the gain region is in direct contact with a receiving surface of the passive Q-switch region;
a solid etalon coupled to the microchip laser base; and
an interfacial coating disposed between the microchip laser base and the solid etalon such that a first surface of the interfacial coating is in direct contact with an emitting surface of the passive Q-switch region and a second surface of the interfacial coating is in direct contact with a receiving surface of the solid etalon, the interfacial coating having a reflectance that substantially matches a Fresnel reflectance of an emitting outer surface of the solid etalon;
wherein:
the microchip laser base and the solid etalon are comprised of a same host material;
the microchip laser base, the solid etalon, and the interfacial coating are bonded together without an adhesive;
an overall thickness of the microchip laser is selected such that the microchip laser is configured to lase on different longitudinal modes in different pulses; and the microchip laser base and the solid etalon form a laser cavity, thicknesses of the microchip laser base and the solid etalon selected such that at least one of the different longitudinal modes is at or near a peak reflectance of the solid etalon.

9. The laser system of claim 8, the microchip laser further comprising a dichroic coating disposed on a surface of the microchip laser base opposite the interfacial coating.

10. The laser system of claim 8, wherein:
a thickness of the solid etalon is approximately 220 µm; and
a thickness of the microchip laser base is approximately 0.8 mm or approximately 1.8 mm.

11. The laser system of claim 8, wherein the outer surface of the solid etalon has a surface coating and a reflectance of the surface coating substantially matches the reflectance of the interfacial coating.

12. The laser system of claim 8, wherein:
the host material comprising the microchip laser base is doped with one or more laser-active or saturable-absorber ions; and
the host material comprising the solid etalon is not doped with any laser-active or saturable-absorber ions.

13. The laser system of claim 8, wherein the microchip laser base comprises phosphate glass co-doped with a laser-active ion and a sensitizer ion.

14. The laser system of claim 8, wherein the microchip laser is configured to lase on only one longitudinal mode per pulse.

15. A method of producing a laser output, the method comprising:
producing a light;
receiving the light at a microchip laser; and
generating the laser output at the microchip laser, the microchip laser comprising:
a microchip laser base comprising a gain region coupled directly to a passive Q-switch region such that an emitting surface of the gain region is in direct contact with a receiving surface of the passive Q-switch region;
a solid etalon coupled to the microchip laser base; and
an interfacial coating disposed between the microchip laser base and the solid etalon such that a first surface of the interfacial coating is in direct contact with an emitting surface of the passive Q-switch region and a second surface of the interfacial coating is in direct contact with a receiving surface of the solid etalon, the interfacial coating having a reflectance that substantially matches a Fresnel reflectance of an emitting outer surface of the solid etalon;
wherein:
the microchip laser base and the solid etalon are comprised of a same host material;
the microchip laser base, the solid etalon, and the interfacial coating are bonded together without an adhesive;
an overall thickness of the microchip laser is selected such that the microchip laser is configured to lase on different longitudinal modes in different pulses; and
the microchip laser base and the solid etalon form a laser cavity, thicknesses of the microchip laser base and the solid etalon selected such that at least one of the different longitudinal modes is at or near a peak reflectance of the solid etalon.

16. The method of claim 15, the microchip laser further comprising a dichroic coating disposed on a surface of the microchip laser base opposite the interfacial coating.

17. The method of claim 15, wherein:
a thickness of the solid etalon is approximately 220 µm; and
a thickness of the microchip laser base is approximately 0.8 mm or approximately 1.8 mm.

18. The method of claim 15, wherein the outer surface of the solid etalon has a surface coating and a reflectance of the surface coating substantially matches the reflectance of the interfacial coating.

19. The method of claim 15, wherein:
the host material comprising the microchip laser base is doped with one or more laser-active or saturable-absorber ions; and
the host material comprising the solid etalon is not doped with any laser-active or saturable-absorber ions.

20. The method of claim 15, wherein the microchip laser base comprises phosphate glass co-doped with a laser-active ion and a sensitizer ion.

* * * * *